Dec. 15, 1953  F. A. KROHM  2,662,609
AIR FILTER
Filed Sept. 19, 1949

INVENTOR.
FRED A. KROHM
BY
Charles S. Penfold
ATTORNEY

Patented Dec. 15, 1953

2,662,609

UNITED STATES PATENT OFFICE 2,662,609

AIR FILTER

Fred A. Krohm, Gary, Ind., assignor to Productive Inventions, Inc., a corporation of Indiana Application September 19, 1949, Serial No. 116,530

1 Claim. (Cl. 183—44)

This invention relates generally to filters and more particularly is directed to a filter assembly or device adapted for use with a fluid operted motor such as a windshield wiper motor.

Motors of this class generally have a chamber or raceway within which a vane or piston oscillates, fluid or air passages communicating with the chamber on opposite sides of the vane, automatic valve operating mechanism for controlling the flow of fluid through the passages to obtain pressure differentials to actuate a drive shaft supporting the vane, and a filter for filtering the air as it is introduced or inhaled into a compartment communicatively connected with the chamber.

The primary object of the subject invention is to provide a filter assembly embodying improved principles of design and construction for prolonging the efficiency and life of the motor. More particularly in this respect an object is to provide a construction in which the automatic valve operating mechanism and the walls of the piston chamber and various passages are at all times well lubricated, thereby enhancing the operation of the motor.

An important object of the invention is to provide a filter device comprised of a pair of cups which when assembled constitute a container or holder for a filter and in which one of the cups may be utilized as a reservoir for oil and the other cup is provided with means for attaching the container to a support.

A significant object of the invention is to provide a container for a filter which will permit the air to simultaneously enter the filter from opposite directions.

A particular object of the invention is to provide a filter device in which two container or housing members are so associated that one member may be easily and quickly detached from the other so that a used filter may be removed and a new filter readily installed.

Also, an object of the invention is to provide a filter device in which the said members are detachably secured together by a snap connection.

A further object of the invention is to provide the container with an air inlet or passage which is positioned or located above that part of the detachable member which may normally serve as a reservoir.

Another object of the invention is to provide a unique filter assembly which readily lends itself to installation on various models or types of motors.

Additional objects of the invention reside in its simplicity of design and construction, economy of construction and assembly on a production basis, efficiency in operation and adjustment, and durablility.

Other objects and advantages of the invention will become apparent after the description hereinafter set forth is considered in conjunction with the drawings annexed hereto.

Figure 1:
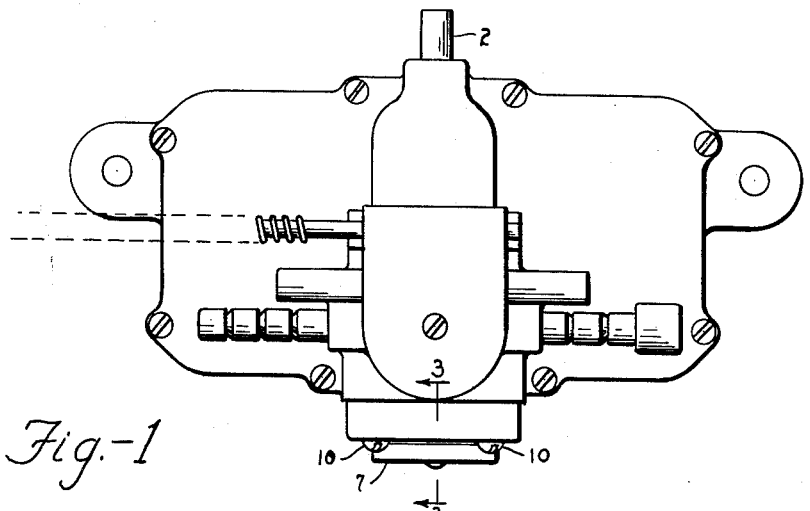
Figure 1 is a top view of a fluid operated motor adapted for use in driving a wiper arm and blade across a windshield.
Figure 2:
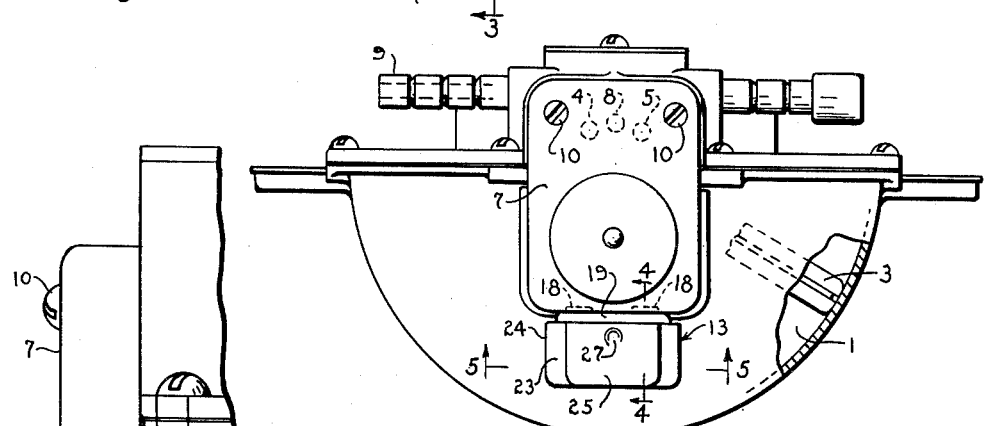
Figure 2 is a front view of the motor showing the attached filter assembly.

The motor, among other things, includes a chamber 1, a shaft 2, and a vane or piston 3 carried by the shaft. A wall of the motor housing is provided with a pair of passageways 4 and 5 which communicate with the chamber on opposite sides of the vane and open into a compartment 6 formed by a cover 7 of the filter assembly. The motor housing is further provided with a passage 8 between passages 4 and 5 which communicates with a vacuum supply through a nipple 9. Automatic valve operating mechanism, not shown, is adapted for disposition in the compartment for alternatively communicatively connecting the passages 4 and 5 with supply passage 8. More specifically, while one side of the vane is being subjected to the vacuum side of the system, air from the atmosphere will be drawn into the chamber at the other side of the vane from the compartment 6. Oscillation of the vane will correspondingly oscillate the shaft and a wiper arm adapted to be mounted thereon.

The filter assembly embodying the subject invention serves to filter air entering the compartment prior to its introduction into the motor chamber. As clearly illustrated, it includes, among other things, the cover 7 above referred to. This cover provides a support for the filter device and is preferably made in the form of a generally rectangular cup or shell so as to house the automatic valve operating mechanism. This cover or support may be attached to the motor in any suitable manner but as herein illustrated it is connected thereto and over the passages 4, 5 and 8 by a pair of screws 10 so that marginal edge portions of the cover may be drawn against a gasket 11 to make the compartment substantially fluid tight.

The container for the filter may be of any size and shape suitable for the purpose. For the particular installation illustrated it is made generally rectangular in cross-section and of a size to more or less nest in an angle formed by the components of the motor. The container preferably includes an inner cup or shell 12 secured to the cover 7 and an outer cup or shell 13 carried by the inner cup.

Figures 3, 4:
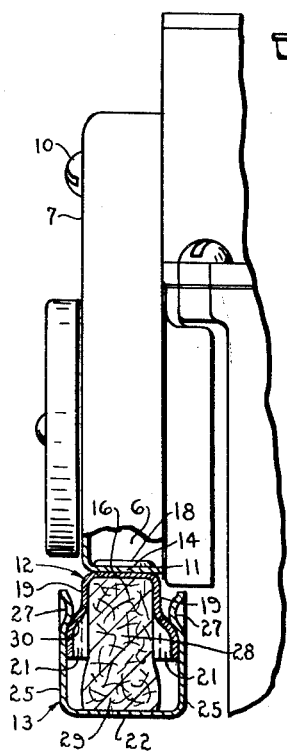
Figure 3 is an enlarged vertical section taken substantially on line 3—3 of Figure 1.
Figure 4 is a transverse section taken substantially on line 4—4 of Figure 2 showing certain details of the construction.

The container may be attached to the cover support 7 in any manner desired, but as herein illustrated, it is preferably permanently anchored in a depending position to the lower end wall 14 of the support by providing a pair of openings 15 (only one is shown) in such wall and forming the bottom wall 16 of the inner cup with protuberances 17 which project into the openings and are overset as indicated at 18 in Figure 4. The interior of the inner cup is thus placed in communication with the interior of the compartment 6. The side walls 19 of the inner cup are substantially flat and parallel, and the end walls are rounded as at 20. Each of the side walls is preferably provided with an elongated abutment 21 formed by stamping portions of the walls outwardly.

Figure 5:
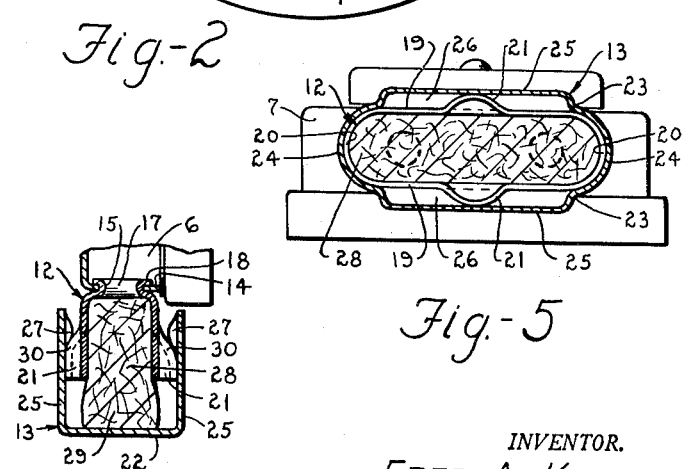
Figure 5 is a transverse section taken substantially on line 5—5 of Figure 2 illustrating other details of the construction.

The outer cup or shell 13 includes a bottom wall 22, side walls 23 and rounded end walls 24. The shape of the outer cup generally corresponds to that of the inner cup but has slightly greater cross-sectional dimensions so as to provide a relatively snug slidable fit between the cups. The central area of each of the side walls 23 is preferably offset to provide a pair of channels having planar portions 25 which lie in a plane parallel to the remaining portions of such walls. When the cups are assembled as exemplified in Figure 5, the planar portions 25 will be spaced from the flat side walls of the inner cup and form in combination therewith generally rectangular ducts or passages 26, which are preferably considerably wider in one dimension than in another. More specifically in this respect the widths of the offsets or channels are considerably greater than the distance between the planar walls 25 of the outer cup and the side walls 19 of the inner cup. The side walls of the outer cup are preferably made resilient and each of the planar portions 25 is provided with an inwardly extending detent 27 formed by an indentation.

A filter 28, preferably constructed of some desirable fibrous material, such as felt, is disposed in the container. The filter is preferably of a size which necessitates pressing or squeezing its inner portion into the inner cup and over the openings or apertures formed by the protuberances and its outer portion 29 into the outer cup in order that the available space in the container will be substantially completely taken up by the filter and so that all air entering through the passages 26 will travel through the filter. This filter is also preferably of a size that its outer portion 29 will be compressed an appreciable extent as shown in Figures 3 and 4 when the cups are assembled. Of particular moment is the fact that the passages are so arranged that air will simultaneously enter the sides of the filter from opposite directions.

In practice the filter is saturated with a suitable oil and since the outer cup is disposed below the inner cup it will serve as a reservoir for any surplus oil, some of which will rise by capillary action and suction into the filter should the upper portion of the latter become dry.

Attention is directed to the fact that the bottom edge of the inner cup is spaced away from the bottom of the outer cup, the purpose of which to provide a space between the outer extremity of the inner cup and the bottom wall 22 of the outer cup, so that the outer portion 29 of the filter will be exposed to the incoming air from the passages 26 prior to passing through the remaining inner portion of the filter. With this arrangement such outer portion exposes maximum surface for the interception of impurities to be filtered from the incoming air, oil with which the filter is impregnated is converted into oil vapor which is carried beyond the filter for maintaining the automatic valve operating mechanism, piston chamber and passages leading thereto in lubricated condition to provide a smooth acting and efficient motor.

The cups may be readily assembled and disassembled. To accomplish assembly, it is merely necessary to push the outer cup into telescoping slidable relationship with the inner cup, and when the detents or abutments 27 engage the outer ends of the abutments 21 the side walls of the outer cup are forced outwardly. When additional pressure is applied to overcome the resistance offered by the abutments and the filter while compressing it, the resilient side walls move back toward each other until the detents engage the inner inclined ends 30 of the abutments to detachably lock the inner cup substantially entirely within the confines of the outer cup as clearly illustrated in Figures 3 and 4. The outer cup may be easily separated from the inner cup by merely pulling the outer cup outwardly to release the detents from the abutments, after which the old filter may be readily removed and replaced with a new one. More particularly in this respect, the rounded end walls 24 of the outer cup are preferably engaged by the hand when detaching the cup. This is desirable because if pressure is applied to the outer surfaces of the side walls for this purpose, it will augment the holding action already established between the detents and abutments. The relationship between the cups, detents and abutments may be such that snap connections are provided between the cups.

In view of the foregoing, it will be apparent that the entrance to each of the passageways 26 is located at a relatively high elevation and adjacent to the upper extremity of the inner cup and that the air is caused to travel first downwardly through these passages between the walls of the cups, then generally transversely into the filter, and finally upwardly therethrough and out the protuberances into the compartment 6. It will be evident that in order to prevent the escape of oil such entrances are situated above that portion of the outer cup which may serve as a reservoir.

It will also be manifest that relatively large surface areas of the opposing sides of the filter are simultaneously subjected to the incoming air. Due to the change in course of travel and the advantages just referred to, the air is more thoroughly filtered.

While I have shown what I believe to be the preferred embodiment of my invention, it is to be understood, of course, that I do not wish to be limited to the details of construction or the exact arrangement of the parts, as it is obvious that the arrangement of these parts and form thereof, might be changed in many ways without departing from the spirit of the invention.

I claim:

A filter device for fluid comprising an inner cup having a bottom wall, side walls and end walls, an opening provided in the bottom wall of the cup through which filtered air can circulate, an outer cup having a closed bottom wall, side walls and end walls, abutment means provided on the cups and located substantially between the respective side walls of the cups detachably locking the cups together with the bottom wall of the outer cup spaced from the bottom wall of the inner cup, a filter supported by the cups and engaging the bottom walls thereof, the side walls of the outer cup being arranged in spaced apart relationship to a portion of the filter and the side walls of the inner cup to provide parallel ducts through which fluid can circulate into the filter.

FRED A. KROHM.

References Cited in the file of this patent
UNITED STATES PATENTS

| Number | Name | Date |
| --- | --- | --- |
| 1,800,326 | Spencer | Apr. 14, 1931 |
| 1,918,006 | Walton | July 11, 1933 |
| 1,951,384 | Zander | Mar. 20, 1934 |
| 1,960,260 | Acton | May 29, 1934 |
| 2,171,400 | Lyon | Aug. 29, 1939 |
| 2,260,853 | Hueber | Oct. 28, 1941 |
| 2,458,745 | Sebok et al. | Jan. 11, 1949 |
| 2,474,746 | Lopez et al. | June 28, 1949 |